Oct. 17, 1933.    C. H. NORTON    1,931,389
END THRUST BEARING FOR SPINDLES
Filed Nov. 26, 1930
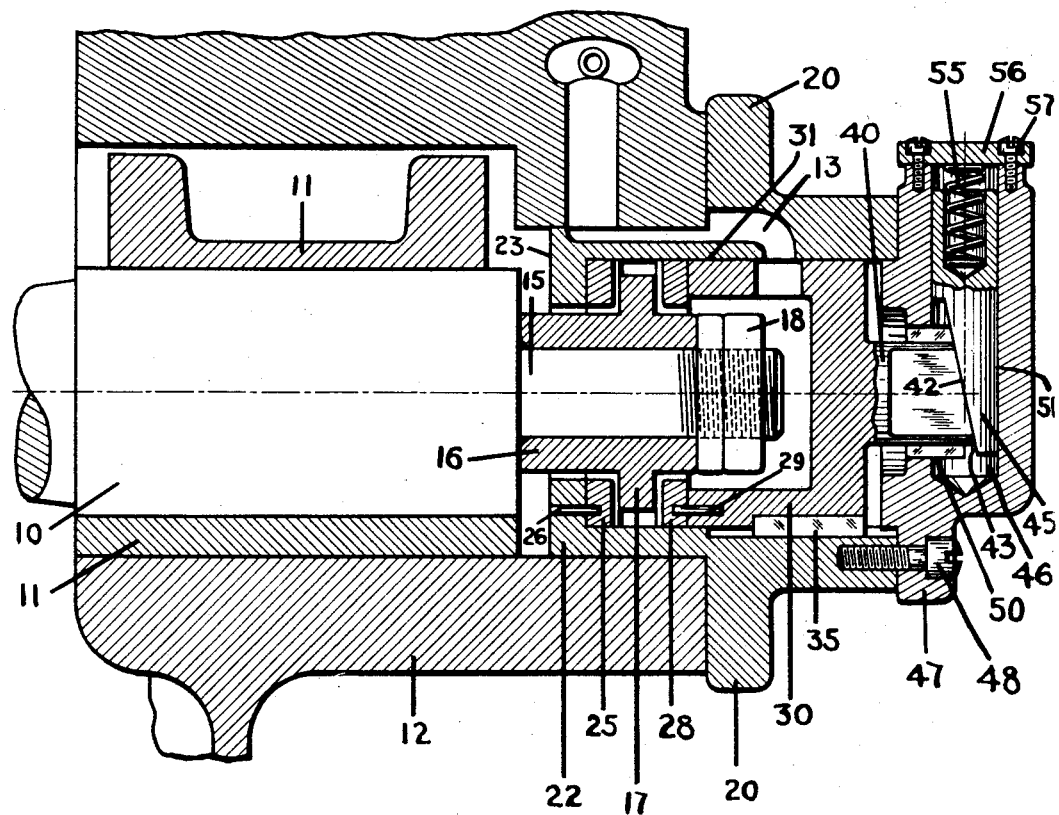
Witnesses
Franklin E. Johnson
W R Greenwood
INVENTOR
Charles H. Norton
By Clayton L. Jenks
ATTORNEY Patented Oct. 17, 1933

1,931,389

UNITED STATES PATENT OFFICE 1,931,389

END THRUST BEARING FOR SPINDLES

Charles H. Norton, Plainville, Conn., assignor to Norton Company, Worcester, Mass., a corporation of Massachusetts Application November 26, 1930
Serial No. 498,379

6 Claims. (Cl. 308—161)

This invention relates to a bearing and more particularly to a self-adjusting end thrust bearing for a rapidly rotating grinding wheel spindle.

It has been found by practical experience that the standard bearing constructions which are useful for ordinary types of machine tools will not be wholly satisfactory in a precision grinding machine for taking up the end thrust of the grinding wheel spindle. For example, one type of bearing comprises a thrust block having several radial grooves forming resisting surfaces against each of which bears a mating collar integral with the spindle to uniformly distribute the end thrust. Such a bearing involves an inherent defect in that the several resisting surfaces wear unequally and cannot be kept in an adjusted condition thereby making it difficult to distribute the thrust uniformly.

In accordance with my prior Patent No. 1,690,425 of November 6, 1928, I have heretofore provided a grinding wheel thrust bearing made up of a fixed annular thrust receiving flange engaging one side face of a flange on the wheel spindle and an adjustable thrust receiving cup engaging the opposite side face of the spindle flange and held under screw adjusted pressure against the latter. This adjustment was made by a small thumb screw, which was so arranged that the machine operator would adjust it only with such power as lay within his fingers, and so would not tighten it enough to stick the bearings. As a matter of fact, it has been found that the operator frequently used an implement to tighten the bearing shoes, thinking that the tighter he got the shoes the less liability there would be for the formation of chatter marks. Consequently, he created conditions which eventually caused the tightly adjusted cup and the fixed bearing to wear. This has resulted in a corresponding looseness of the bearing portions and the tendency for the spindle to vibrate longitudinally and whip between the loose bearings. Vibration, even to a very slight extent, is extremely objectionable in a grinding machine, since it is transmitted to the grinding wheel and so causes chatter marks or other detrimental effects to appear on the surface of the work being ground or polished.

It is accordingly an object of my invention to overcome such difficulties and to provide an improved bearing construction which will be highly serviceable for use with a grinding wheel spindle in a precision grinding machine, and in which the adjustment for wear of the bearing surfaces is taken care of automatically and does not depend on the skill or judgment of the operator.

A further object of this invention is to provide a self-adjusting bearing which is so constructed that it is practically impossible for the operator to adjust it manually, and which is automatically maintained in a correct condition at all times in its service.

In accordance with my invention I provide a bearing, which is particularly adapted for receiving the end thrust of a grinding wheel spindle in a precision grinding machine, comprising essentially a fixed bearing of such shape that it constitutes a thrust receiving member and which is so located as to receive the resultant thrust of usage. Cooperating with the fixed bearing surface is a floating shoe or block which is arranged to move toward and from the spindle, and this shoe preferably contacts with a thrust portion, as a collar or flange, formed on the spindle surface. In order that the bearings may be self-adjusting, a locking pin is arranged to move in a guideway so that it will contact with an outer surface of the floating shoe and the parts are so constructed and arranged that this locking pin is biased for movement inwardly to maintain a firm contact with the shoe. This biased movement may be obtained either by so arranging the guideway for the locking pin and the associated parts that the pin will move downwardly under the influence of gravity, or it may be moved in its guideway by means of a spring or other suitable device which acts automatically to give a desired and preferably a substantially constant pressure on the pin, thus tending to urge it to a locking position. As a further feature of the invention I preferably so arrange the parts that the locking pin is normally rendered inaccessible for manual adjustment by the operator and the device therefore cannot be tampered with or the bearings made too tight during the running operation.

Referring now to the drawing which illustrates one embodiment of this invention, and in which like reference numerals indicate like parts:

The figure is a partial view in section of a grinding wheel spindle bearing with the parts broken away to disclose the thrust bearing structure embodying my invention.

The bearing illustrated in the drawing is particularly applicable for service as one of the bearing supports of a grinding wheel spindle which are arranged on opposite sides of the driving pulley to take up the radial and end thrust of such machines, although it will be apparent that this bearing is of general utility in many fields.

In the specific embodiment of my invention selected for illustration, I have shown in the drawing a portion of a grinding wheel spindle 10, rotatably mounted in suitable radial bearings 11 which may be integral with or secured to a casing or support 12 of the wheel slide. These bearings 11 may be constructed of spaced members, and the spaces arranged to serve for the passage of oil which has been first delivered by an oil duct 13 to the engaging surfaces of the thrust bearing.

In order that the end thrust or longitudinal play in the grinding wheel spindle may be adjusted automatically at all times, I provide the construction illustrated in the drawing. As there shown, the end of the wheel spindle 10 is provided with an extension outside of the radial bearing having a reduced portion 15 which carries a sleeve 16 provided with a flange 17. This flange has two opposed end thrust receiving surfaces adapted to transmit the end thrust to a fixed thrust receiving member and to an adjustable member arranged to take up the wear in the bearing. The flange 17 is spaced at a considerable distance from the radial bearings and the larger portion of the spindle and with its sleeve is held rigidly on the portion 15 by a pair of lock nuts 18. The projecting end of the housing 12 is bored to receive a cap 20 suitably secured thereto which has an inwardly projecting reduced portion 22 provided with a flange 23 extending radially inwardly and located in the space between and spaced from the larger portion of the wheel spindle 10 and the flange 17. In order to prolong the wearing qualities of this inwardly projecting flange 23, it is provided with a hardened steel collar 25 non-rotatably secured to the flange by a pin 26. It will be apparent that this collar 25 provides a rigid abutment to take the thrust of the spindle to the left.

The thrust of the spindle in the other direction is taken up by a similar hardened steel collar 28 secured by a pin 29 to the end of a floating cup-shaped bearing shoe 30. This shoe is slidably mounted in the bore 31 of the projecting portion 22 and is prevented from turning in the cap 20 by means of a key 35 as shown in the drawing. The shoe is mounted on the opposite side of the rotatable flange 17 from the fixed collar 25 and slidable toward the flange 17 to hold the collar 28 correctly seated thereagainst. The wall of the bore 31 forms a guideway for the shoe 30 and permits it to move freely therealong but is of a sufficiently tight fit to prevent lateral movement of the shoe and maintain the thrust surface of the collar 28 substantially parallel at all times to the thrust receiving surfaces of the spindle.

In order to insure that the floating shoe 30 remains always in proper contact with the flange 17 of the grinding wheel spindle to properly control the end play of the spindle, I have provided a construction in which the end thrust member is automatically adjusted in its position as the bearings wear but cannot vibrate or permit vibration of the spindle. To this end, I provide a follow-up or a locking device which comprises a movable follow-up member contacting with the floating bearing shoe, and which is so constructed and arranged that it is biased towards such contact and causes the shoe in turn to be biased in its movement towards the thrust transmitting surface of the spindle. This device may comprise a follow-up member which may be movable under the influence of gravity, but I preferably employ a positively acting device, such as a spring, capable of applying a desired force to the follow-up member and maintain the oil films between the thrust receiving parts of the proper thickness. In the preferred form, as illustrated, I employ a pin slidably mounted in a guideway and engaging the outer end surface of the shoe and which is so arranged that it may move the shoe inwardly to take up any wear of the bearings. For this purpose the guideway, the pin and the floating shoe have their operative contacting surfaces arranged at such angles that the pin serves as a very thin wedge which may move only inwardly under its bias to tighten the bearing.

In order that the shoe 30 may be automatically adjusted as the spindle flange wears or when for any other reason the bearing becomes loose, the shoe is provided with an extension having a reduced portion 40 which is provided with a beveled end surface 42 contacting with the tapered side surface 43 of a locking pin 45 beveled to correspond therewith. This locking pin comprises a cylindrical body slidably mounted in a cylindrical guideway 46 drilled into a cover plate 47 which is secured to the cap 20 by screws 48. The portion 40 is arranged to slide through an aperture 50 formed in the cover plate 47 and piercing the inner wall of the guideway 46.

As illustrated, the line of thrust from the center of the spindle outwardly through the center of the floating shoe 30 will make substantially a right angle with the center line of the locking pin, and the rear wall of the locking pin guideway, represented by line 51, makes a very acute angle with the plane of contact between the beveled face 43 of the locking pin and the shoe, so that the outward pressure of the slidable shoe will not force the locking pin outwardly. In other words, the pin serves as a wedge engaging the outer face 42 of the shoe 30 and the thrust thereagainst is absorbed by the side wall surface 51 of the guideway 46, so that when the pin moves inwardly it wedges the floating bearing shoe in position against the spindle flange 17.

A definite and predetermined pressure is preferably applied to this locking pin so that the floating bearing shoe will be biased towards the grinding wheel spindle flange with sufficient force to provide an oil film of substantially the same thickness as that of the oil film between the spindle flange and the fixed thrust bearing surface. While a pin of suitable weight moving solely under the influence of gravity may be used, I preferably employ a positively acting device, such as a spring, so as to provide the necessary force without making the parts unduly large. To this end, a spring 55 is mounted within a depression in the upper end of the locking pin 45. One end of the spring engages the pin and the other end is held by means of the cap plate 56 which is suitably fastened as by means of cap screws 57 to the casing 47 and forms a closure over the hole 46. In this way, a compression spring 55 of suitable strength is used to exert a constant and uniform pressure always downwardly on the locking pin 45 and so hold the bearing shoe 30 firmly against the spindle flange with sufficient pressure to provide an oil film of the required thickness and yet not enough to stick the spindle. In other words, the locking pin is biased toward a locking position which steadies and properly holds the wheel spindle from longitudinal movement.

It will therefore be seen that in accordance with this construction I have provided a self-adjusting end thrust bearing which is so constructed that the parts will be maintained always in a correct position relative to the spindle. By the new arrangement, it will be practically impossible for the operator of the machine to tamper with the bearings and so tighten them as to stick the wheel spindle; but a uniform adjustment of the end play will always be maintained throughout a long life of useful service for the bearing. It will also be understood that the bearing is to be oiled in any suitable manner, such as is shown in my prior patent, and that other features of my prior patented bearing constructions may be incorporated with this special bearing if desired. It will also be appreciated that various mechanical equipment devices may be substituted for the locking pin herein described so as to provide a self-adjusting bearing, the essential feature of the invention being the slidable thrust shoe and a follow-up device which permits the shoe to move only inwardly towards the spindle member, hence the claims are to be interpreted accordingly.

Having thus described my invention, what I claim as new and desire to secure by Letters Patent is:

1. A spindle bearing comprising a fixed bearing member which sustains the longitudinal thrust of the spindle in one direction, a floating bearing shoe serving to hold the spindle properly against the fixed bearing member, means to prevent lateral movement of the shoe, and a self-adjusting follow-up device including a guideway and a pin freely movable therein which contacts with and is biased inwardly towards the floating shoe, said guideway, pin and floating shoe having their contacting surfaces arranged at such angles that the shoe may move only inwardly towards the fixed bearing member to take up the wear in the bearing.

2. A thrust bearing for a spindle having a flange providing two opposed end thrust receiving surfaces comprising a casing, an annular thrust receiving member fixedly mounted on the casing and receiving the thrust of said flange in one direction, a floating thrust receiving shoe engaging the opposite side of the spindle flange, and means including a movable wedge-shaped follow-up member acting automatically to bias the shoe inwardly and move it towards the flange to take up any end play in the bearing and prevent outward movement thereof.

3. A bearing for a spindle having two opposed end thrust receiving surfaces comprising a fixed bearing member arranged to receive the end thrust of one of said surfaces, a floating shoe freely movable towards and maintained in engagement with the other surface, means to prevent lateral movement of the shoe, a locking pin, means forming a guideway for the pin, and positively acting means which biases the pin towards an inward movement and firm engagement with the shoe, said guideway, pin and floating shoe having their contacting surfaces arranged at such angles that the pin may move only inwardly and prevent the shoe from moving outwardly under the spindle pressure, whereby the floating shoe moves only to take up any play and so holds the spindle correctly in position against the fixed bearing.

4. A bearing for a spindle having two opposed end thrust receiving surfaces comprising a fixed thrust receiving bearing which normally sustains the longitudinal thrust of one of said surfaces, a floating shoe arranged to receive the opposed end thrust of the other surface, a locking pin slidably engaging the shoe, a guideway therefor, and positively acting means tending to move the pin inwardly into firm contact with the shoe, said guideway, pin and shoe having their contacting surfaces arranged at such angles that the end thrust will not move the pin outwardly, and thereby holding the shoe in proper contact with the spindle.

5. A bearing for a spindle having two opposed end thrust receiving surfaces comprising a fixed end thrust bearing member serving to receive the thrust of one of said surfaces, a floating end thrust shoe opposed to said fixed bearing which contacts with the other surface, a guideway for the shoe which permits inward movement and prevents lateral movement thereof, a follow-up pin having a thin wedge-shaped portion engaging the outer face of the bearing shoe, a casing wall forming a guideway and providing a thrust receiving surface for the pin, and a spring arranged to exert a force tending to constantly move the locking pin inwardly and thereby hold the floating shoe with a proper pressure against the spindle, said guideways, pin and shoe having their contacting surfaces arranged at such angles that the bearing shoe and the locking pin may not move outwardly under the end thrust of the spindle.

6. A thrust bearing for a spindle having a flange provided with opposed thrust receiving surfaces comprising a fixed annular member constituting a thrust receiving bearing engaging one side of the flange, a floating thrust receiving cup having a bearing surface engaging the opposite side of said flange, means including a key so arranged that the cup will not turn but will move only towards the spindle flange, a slidable wedge-shaped pin engaging the end of the cup and arranged to follow up the longitudinal movement of the cup towards the spindle flange and prevent any retreating movement therefrom, positively acting means tending to move the pin inwardly, and means which normally renders the adjustment inaccessible.

CHARLES H. NORTON.